(12) United States Patent
Huang

(10) Patent No.: US 6,250,794 B1
(45) Date of Patent: Jun. 26, 2001

(54) ICE CREAM MAKING APPARATUS AND AN AGITATOR FOR THE SAME

(76) Inventor: Olivia Huang, No. 2, Alley 6, Lane 403, Sec. 3, Chung-Shan Rd., Wu-Tze Hsiang, Taichung Hsien (TW)

( * ) Notice: Subject to any disclaimer, the term of this patent is extended or adjusted under 35 U.S.C. 154(b) by 0 days.

(21) Appl. No.: 09/714,335

(22) Filed: Nov. 16, 2000

(30) Foreign Application Priority Data

Jul. 21, 2000 (TW) .............................................. 089212676

(51) Int. Cl.[7] .............................. A23G 9/00; A23G 9/12; A23G 9/20; B01F 7/16; B01F 15/06
(52) U.S. Cl. .............................. 366/149; 62/342; 99/348; 99/452; 99/455; 366/279; 366/194
(58) Field of Search .............................. 99/348, 452–455, 99/460–466, 470, 517; 62/342, 343, 354; 366/144–149, 247, 230, 279, 205, 293, 290, 295, 312, 320, 324, 194–196, 601

(56) References Cited

U.S. PATENT DOCUMENTS

| | | | |
|---|---|---|---|
| 4,070,957 | * | 1/1978 | Korekawa et al. ..................... 99/455 |
| 4,583,863 | * | 4/1986 | Pandolfi ............................... 366/149 |
| 4,632,566 | * | 12/1986 | Masel et al. ........................ 62/343 X |
| 4,643,583 | * | 2/1987 | Cecchini .............................. 366/149 |
| 4,664,529 | * | 5/1987 | Carlson ............................ 366/149 X |
| 4,708,489 | * | 11/1987 | Carlson ................................ 366/149 |
| 4,716,822 | * | 1/1988 | O'Brien ................................. 99/455 |
| 4,974,965 | * | 12/1990 | Heinhold et al. .................. 99/455 X |
| 5,076,153 | * | 12/1991 | Takahashi et al. ..................... 99/327 |
| 5,351,606 | * | 10/1994 | Matsuzaki .............................. 99/348 |
| 5,363,746 | * | 11/1994 | Gordon ................................. 99/328 |
| 5,433,139 | * | 7/1995 | Kitagawa et al. ..................... 99/327 |
| 5,549,042 | * | 8/1996 | Bukoschek et al. ............... 62/342 X |

* cited by examiner

Primary Examiner—Timothy F. Simone
(74) Attorney, Agent, or Firm—Trop, Pruner & Hu, PC

(57) ABSTRACT

An agitator for an ice cream making apparatus includes a shaft defining a vertical axis, left and right arms, a primary blade member, diametrically opposed left and right limbs, an extruding screw member, and an auxiliary blade member disposed above the primary blade member. The primary blade member is rotatable relative to the auxiliary blade member, which is held fast when the shaft rotates.

7 Claims, 6 Drawing Sheets

ICE CREAM MAKING APPARATUS AND AN AGITATOR FOR THE SAME

BACKGROUND OF THE INVENTION

1. Field of the Invention

This invention relates to an ice cream making apparatus and an agitator for the same, more particularly to a household ice cream making apparatus and an agitator for the same.

2. Description of the Related Art

FIG. 1 illustrates a conventional ice cream making apparatus. The apparatus includes a stand 1, a container 3 mounted on the stand 1, an agitator 5 disposed inside the container 3, a cover 2 covering the top of the container 3, and a driving unit 4 mounted on the stand 1 and connected to the agitator 5. The container 3 has a bottom outlet 301.

The agitator 5 includes a shaft 501 defining an axis, a pair of first left and right arms 510, 511 extending radially and oppositely from a top end of the shaft 501, a pair of second left and right arms 506, 507 extending radially and oppositely from a bottom end of the shaft 501 and aligned vertically and respectively with the first left and right arms 510, 511, a pair of third left and right arms 502, 503 distal from the shaft 501 and respectively interconnecting the first and second left arms 510, 506 and the first and second right arms 511, 507, and an extruding screw portion 504 extending downwardly from the bottom end of the shaft 501 and into the bottom outlet 301. The third left and right arms 502, 503 respectively have left and right wing portions 509, 508 extending inclinedly therefrom. The right wing portion 508 extends to a position close to the inner wall of the container 3 so as to avoid coherent lumps of the ice cream near the inner side wall of the container 3. The second left and right arms 506, 507 respectively have wing portions inclined oppositely at angles relative to the axis to provide high turbulent flow of the ice cream, thereby enhancing the mixing effect of the ice cream.

The aforesaid agitator 5 is disadvantageous in that since the ice cream near the inner wall of the container 3 is gradually frosted, the frosted lumps of the ice cream will eventually be carried away and enter into the bottom outlet 301 of the container 3 during the course of agitation, thereby blocking the bottom outlet 301.

SUMMARY OF THE INVENTION

Therefore, it is an object of the present invention to provide an agitator for an ice cream making apparatus that is capable of overcoming the aforementioned drawback.

According to one aspect of this invention, an agitator for mounting in a container of an ice cream making apparatus of this invention comprises: a first shaft defining a vertical axis; left and right arms extending radially and oppositely from a bottom end of the first shaft; a primary blade member disposed below the left and right arms, and having left and right blades aligned vertically and respectively with the left and right arms, and a central hole formed between the left and right blades, the left and right blades extending radially and oppositely from the central hole; diametrically opposed left and right limbs respectively interconnecting ends of the left arm and the left blade and ends of the right arm and the right blade, and respectively having parallel left and right plates and left and right wings projecting inclinedly and respectively from the left and right plates and extending respectively between the left arm and the left blade and between the right arm and the right blade; an extruding screw member having a hollow second shaft extending downwardly from a periphery of the central hole and coaxial with the first shaft, the second shaft confining a channel that is communicated with the central hole; and an auxiliary blade member including a rod that is received in the channel and that has one end extending through the central hole, and left and right leaves extending radially and oppositely from the end of the rod and substantially parallel to the left and right blades, the primary blade member and the left and right limbs being rotatable about the axis when the first shaft rotates, the auxiliary blade member being adapted to be held fast by the container when the primary blade member and the left and right limbs rotate about the axis.

According to another aspect of this invention, an ice cream making apparatus of this invention comprises: a stand; a container mounted on the stand and having a bottom outlet; an agitator mounted in the container; and a driving unit mounted on the stand for driving the agitator to rotate about the axis. The agitator includes: a first shaft defining a vertical axis; left and right arms extending radially and oppositely from a bottom end of the first shaft; a primary blade member disposed below the left and right arms, and having left and right blades aligned vertically and respectively with the left and right arms, and a central hole formed between the left and right blades, the left and right blades extending radially and oppositely from the central hole; diametrically opposed left and right limbs respectively interconnecting ends of the left arm and the left blade and ends of the right arm and the right blade, and respectively having parallel left and right plates and left and right wings projecting inclinedly and respectively from the left and right plates and extending respectively between the left arm and the left blade and between the right arm and the right blade; an extruding screw member having a hollow second shaft extending downwardly from a periphery of the central hole and coaxial with the first shaft, the second shaft confining a channel that is communicated with the central hole; and an auxiliary blade member including a rod that is received in the channel and that has one end extending through the central hole, and left and right leaves extending radially and oppositely from the end of the rod and substantially parallel to the left and right blades, the primary blade member and the left and right limbs being rotatable about the axis when the first shaft rotates, the auxiliary blade member being held fast by the container when the primary blade member and the left and right limbs rotate about the axis.

BRIEF DESCRIPTION OF THE DRAWINGS

In drawings which illustrate embodiments of the invention.

DETAILED DESCRIPTION OF THE PREFERRED EMBODIMENTS

Figure 1:
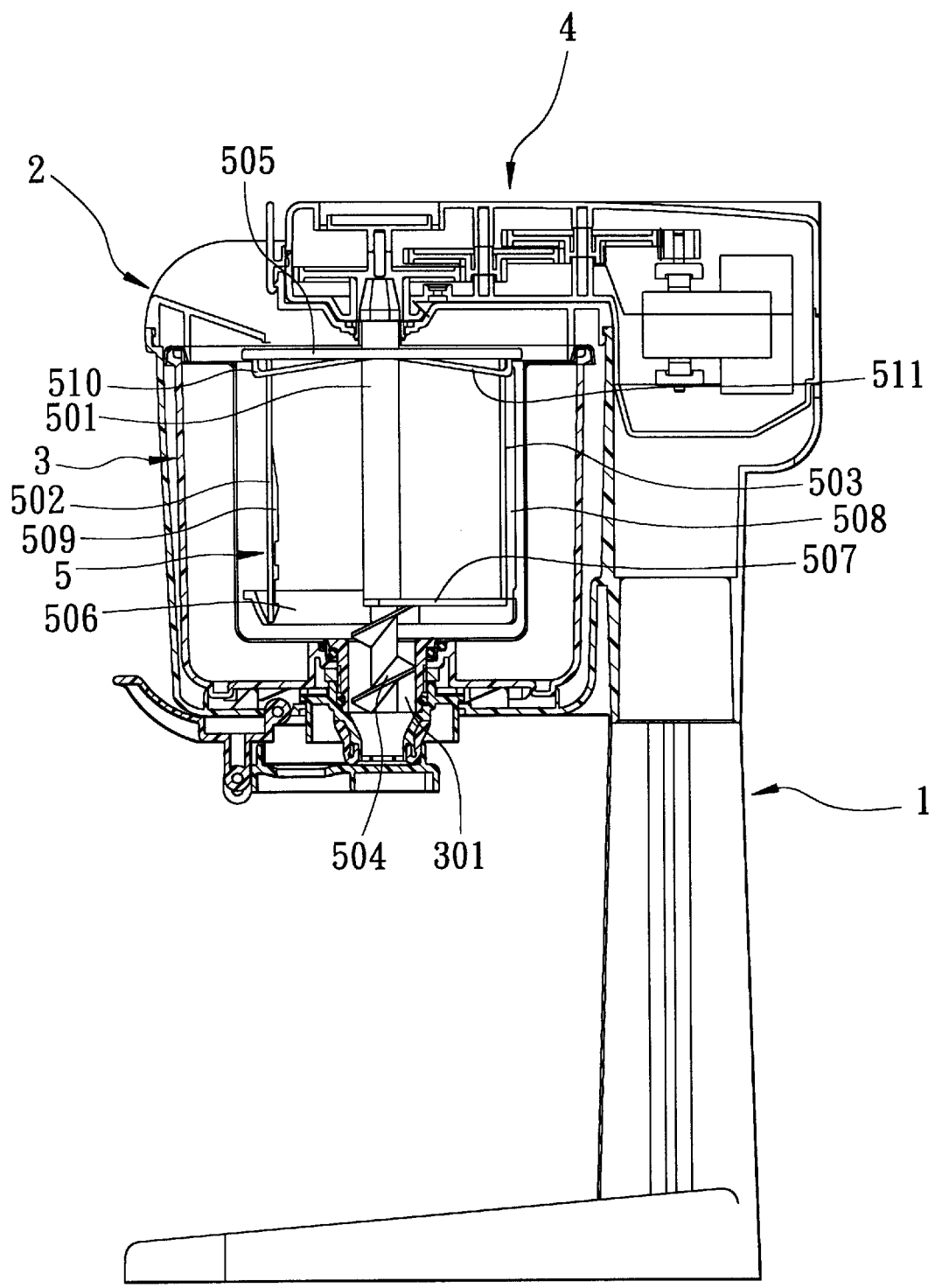
FIG. 1 is a cross-sectional side view of a conventional agitator installed in an ice cream making apparatus.
Figure 2:
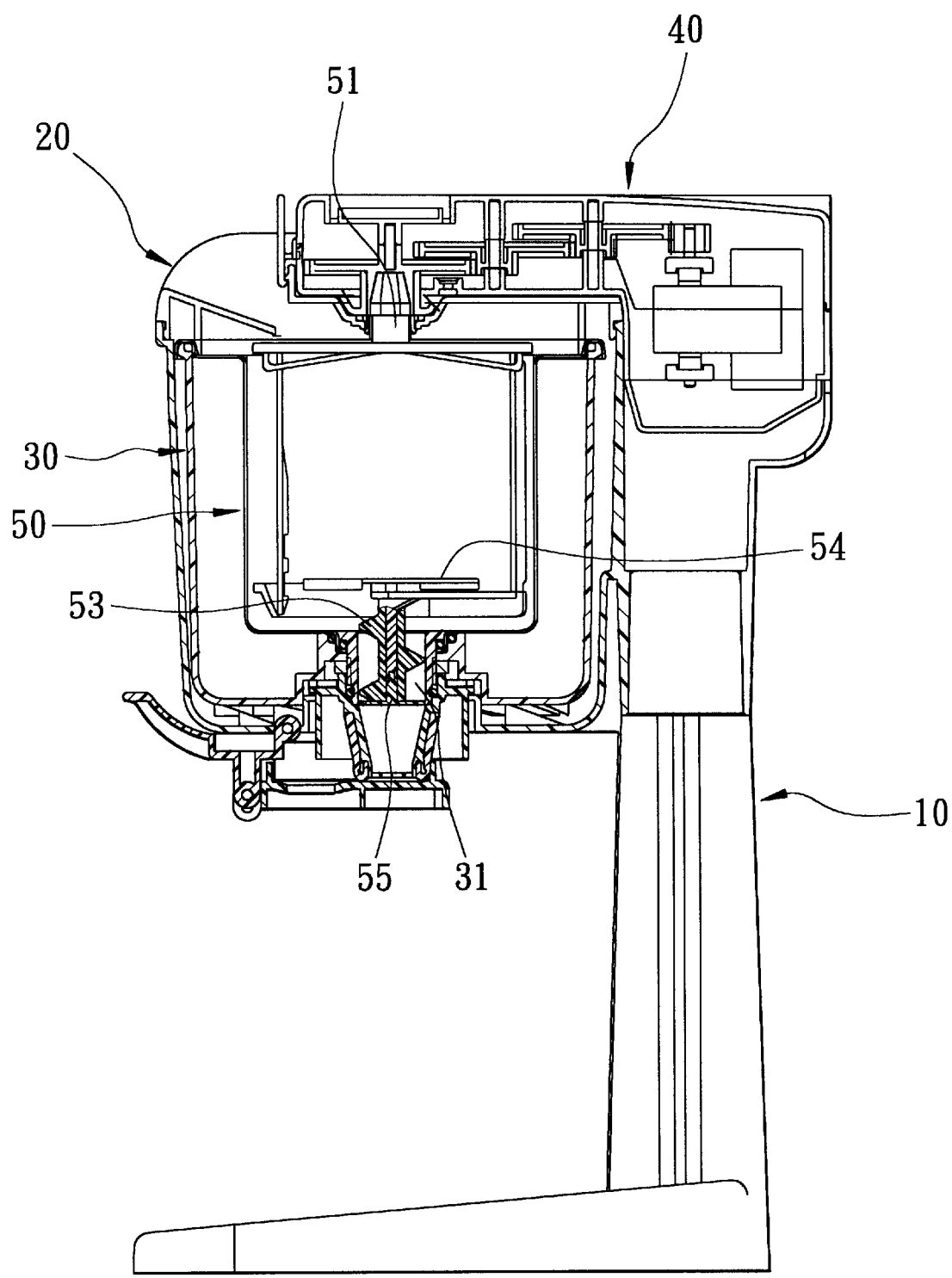
FIG. 2 is a cross-sectional side view to illustrate a preferred embodiment of an agitator installed in an ice cream making apparatus according to this invnetion.

FIGS. 2 to 5 illustrate an ice cream making apparatus embodying this invention. The ice cream making apparatus includes a stand 10, a container 30 mounted on the stand 10, an agitator 50 disposed inside the container 30, a cover 20 covering the top of the container 30, and a driving unit 40 mounted on the stand 10 and connected to the agitator 50. The container 30 has a bottom outlet 31, and a pair of stoppers 32 projecting inwardly from a peripheral edge of the bottom outlet 31.

Figure 3:
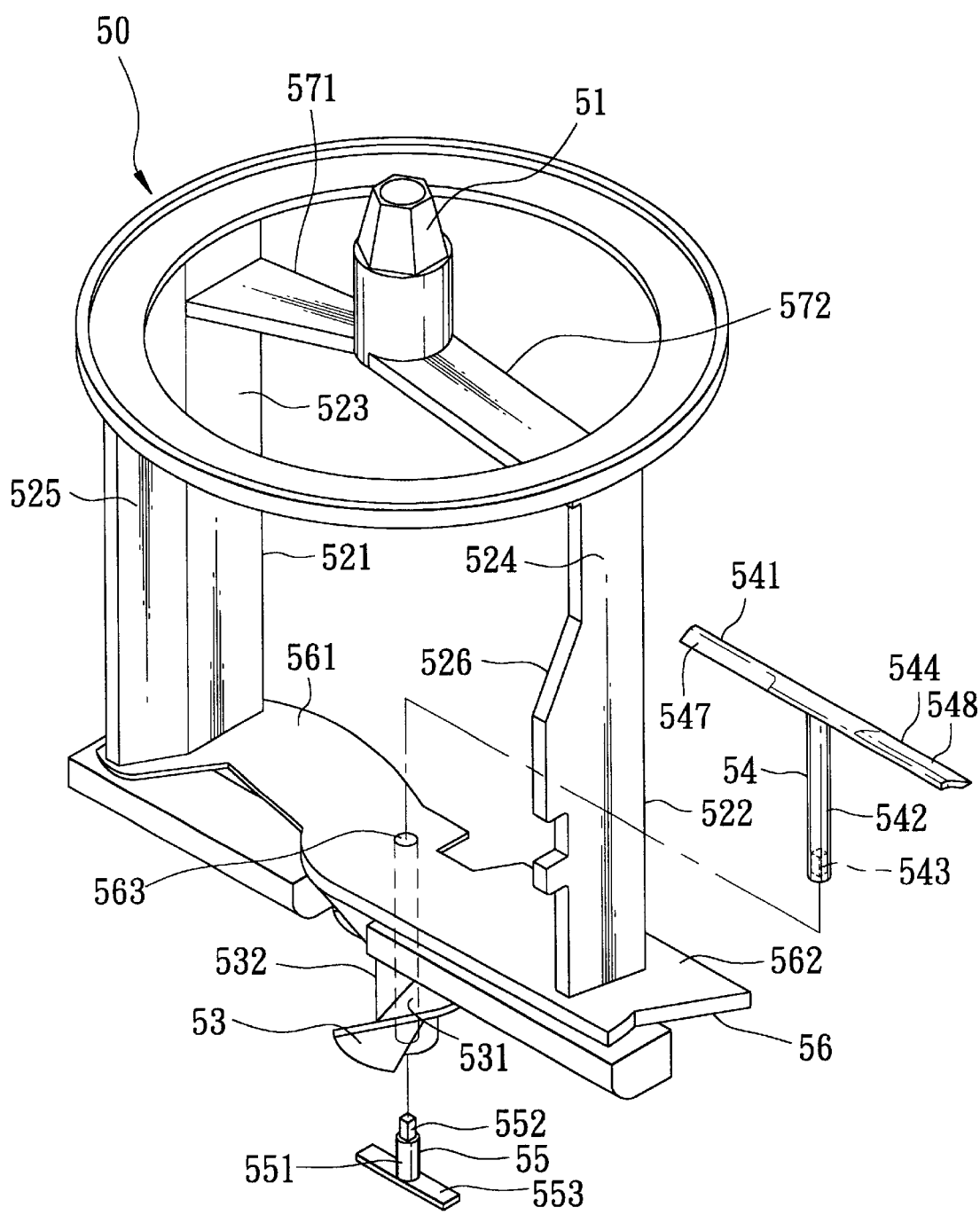
FIG. 3 is an exploded perspective view of the agitator of FIG. 2.
Figure 4:
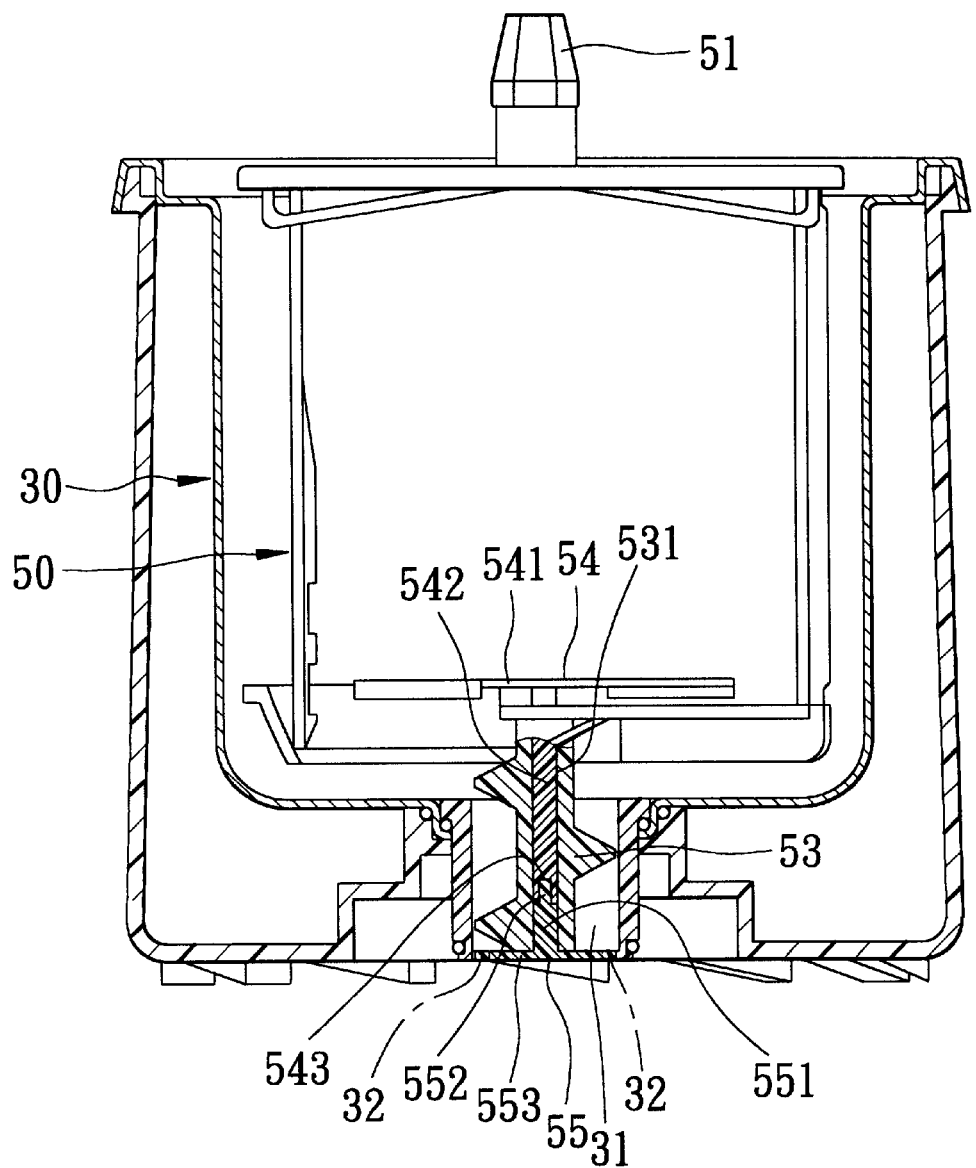
FIG. 4 is a cross-sectional side view of the agitator installed in a container of the ice cream making apparatus of FIG. 2.

With further reference to FIGS. 3 and 4, the agitator 50 includes: a first shaft 51 connected to the driving unit 40 and defining a vertical axis; left and right arms 571, 572 extending radially and oppositely from a bottom end of the first shaft 51; a primary blade member 56 disposed below the left and right arms 571, 572 and having left and right blades 561, 562 that are aligned vertically and respectively with the left and right arms 571, 572, and a central hole 563 that is formed between the left and right blades 561, 562; diametrically opposed left and right limbs 521, 522 respectively interconnecting ends of the left arm 571 and the left blade 561 and ends of the right arm 572 and the right blade 562; an extruding screw member 53 having a hollow second shaft 532 that extends downwardly from a periphery of the central hole 563 into the bottom outlet 31 of the container 30 and that confines a channel 531 communicating with the central hole 563 and coaxial with the first shaft 51; and an auxiliary blade member 54 including a rod 542 that is received in the channel 531 and that has one end extending through the central hole 563 and into the container 30, and left and right leaves 541, 544 that extend radially and oppositely from the end of the rod 542 and that are substantially parallel to the left and right blades 561, 562. The left and right limbs 521, 522 and the primary blade member 56 are rotatable about the axis when the coaxial first and second shafts 51, 532 are driven by the driving unit 40.

The left and right limbs 521, 522 respectively have parallel left and right plates 523, 524 and parallel left and right wings 525, 526 projecting inclinedly and respectively from the left and right plates 523, 524 and extending respectively between the left arm 571 and the left blade 561 and between the right arm 572 and the right blade 562. The right wing 525 inclines from the right plate 523 away from the first shaft 51.

Figure 5:
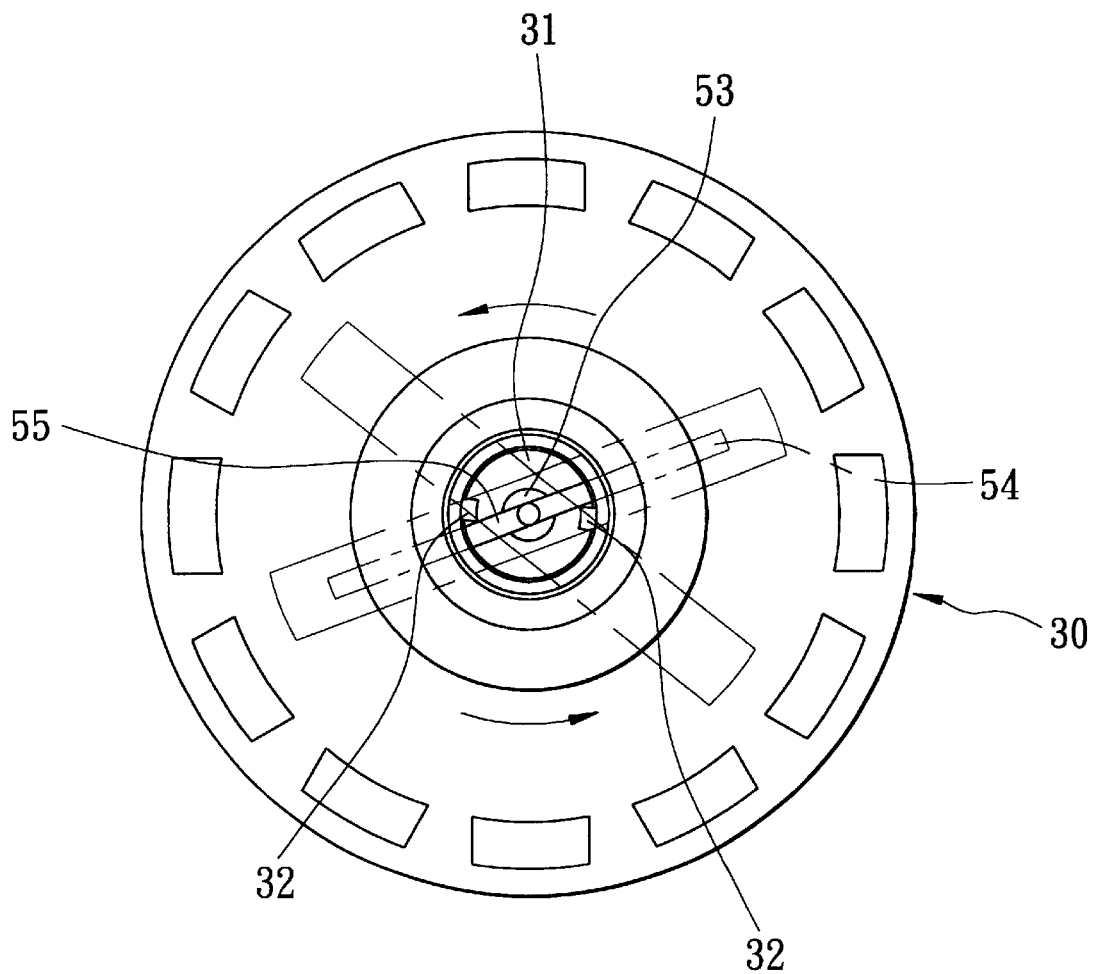
FIG. 5 is a top view to illustrate positions of a primary blade member relative to an auxiliary blade member of the agitator of FIG. 2 in the container.

The agitator 50 further includes a T-shaped positioner 55 that has a bottom plate 553 having two opposite ends engaging the stoppers 32 of the container 3, and a cylinder 551 projecting upwardly from the bottom plate 553 into the channel 531. A bottom recess 543, which has a square cross-section, is formed in the other end of the rod 54 within the channel 531. A square protrusion 552 projects upwardly from a top end of the cylinder 551 and engages the bottom recess 543 so as to hold the auxiliary blade member 54 onto the container 30 when the primary blade member 56 and the left and right limbs 521, 522 rotate about the axis. FIG. 5 illustrates rotation of the primary blade member 56 from one position to another position relative to the auxiliary blade member 54, which is held fast in the container 30.

The left and right leaves 541, 544 of the auxiliary blade member 54 respectively have left and right upper faces 547, 548 that incline oppositely at angles relative to the axis.

Figure 6:
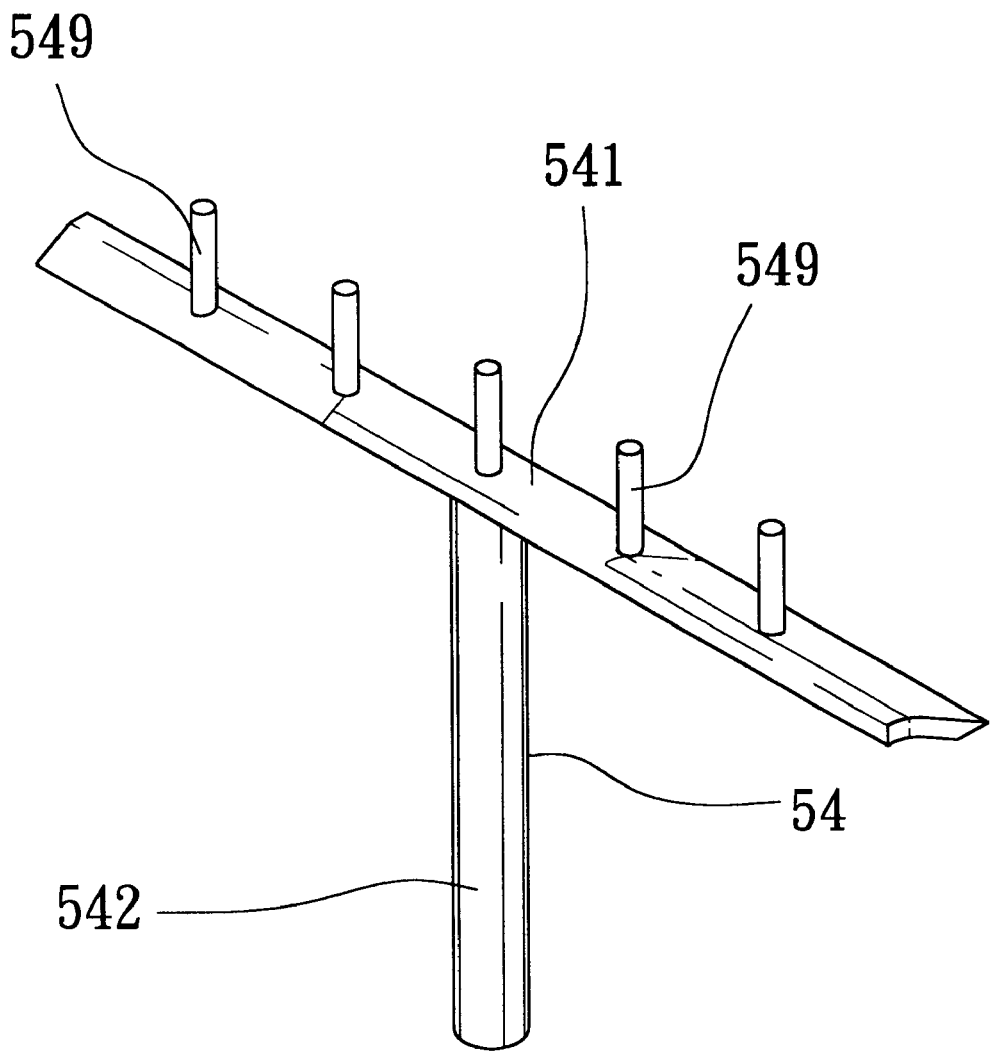
FIG. 6 is a perspective view of a modified auxiliary blade member of the agitator of FIG. 2.

FIG. 6 illustrates a modified auxiliary blade member 54 which includes a plurality of spaced apart posts 549 projecting upwardly from the left and right upper faces 547, 548 of the left and right leaves 541, 544.

With the auxiliary blade member 54, the aforesaid frosted lumps of the ice cream can be broken into relatively small lumps which are subsequently defrosted by mixing with the whole body of the ice cream before entering into the bottom outlet 31 of the container 30 during the course of agitation of the ice cream, thereby avoiding the blocking problem as encountered in the prior art.

With the invention thus explained, it is apparent that various modifications and variations can be made without departing from the spirit of the present invention. It is therefore intended that the invention be limited only as recited in the appended claims.

I claim:

1. An agitator adapted to be mounted in a container of an ice cream making apparatus, comprising:

a first shaft defining a vertical axis;

left and right arms extending radially and oppositely from a bottom end of said first shaft;

a primary blade member disposed below said left and right arms, and having left and right blades aligned vertically and respectively with said left and right arms, and a central hole formed between said left and right blades, said left and right blades extending radially and oppositely from said central hole;

diametrically opposed left and right limbs respectively interconnecting ends of said left arm and said left blade and ends of said right arm and said right blade, and respectively having parallel left and right plates and left and right wings projecting inclinedly and respectively from said left and right plates and extending respectively between said left arm and said left blade and between said right arm and said right blade;

an extruding screw member having a hollow second shaft extending downwardly from a periphery of said central hole and coaxial with said first shaft, said second shaft confining a channel that is communicated with said central hole; and an auxiliary blade member including a rod that is received in said channel and that has one end extending through said central hole, and left and right leaves extending radially and oppositely from said end of said rod and substantially parallel to said left and right blades, said primary blade member and said left and right limbs being rotatable about said axis when said first shaft rotates, said auxiliary blade member being adapted to be held fast by the container when said primary blade member and said left and right limbs rotate about said axis.

2. The agitator of claim 1, further comprising a T-shaped positioner that has a bottom plate adapted to be held fast by the container when said first shaft rotates, and a cylinder projecting upwardly from said bottom plate into said channel to connect with the other end of said rod.

3. The agitator of claim 2, wherein said rod has a bottom recess, and said cylinder has a protrusion with a shape conforming to and that engages said bottom recess.

4. The agitator of claim 3, wherein said left and right leaves respectively have left and right upper faces that incline oppositely at angles relative to said axis.

5. The agitator of claim 4, wherein said left and right wings are disposed on a same side of a diametral line that passes through said left and right blades.

6. The agitator of claim 4, wherein said auxiliary blade member further has a plurality of spaced apart posts projecting upwardly from said left and right upper faces.

7. An ice cream making apparatus, comprising:

a stand;

a container mounted on said stand and having a bottom outlet;

an agitator mounted in said container; and a driving unit mounted on said stand for driving said agitator to rotate about said axis, wherein said agitator includes:

a first shaft defining a vertical axis;

left and right arms extending radially and oppositely from a bottom end of said first shaft;

a primary blade member disposed below said left and right arms, and having left and right blades aligned vertically and respectively with said left and right arms, and a central hole formed between said left and right blades, said left and right blades extending radially and oppositely from said central hole;

diametrically opposed left and right limbs respectively interconnecting ends of said left arm and said left blade and ends of said right arm and said right blade, and respectively having parallel left and right plates and left and right wings projecting inclinedly and respectively from said left and right plates and extending respectively between said left arm and said left blade and between said right arm and said right blade;

an extruding screw member having a hollow second shaft extending downwardly from a periphery of said central hole and coaxial with said first shaft, said second shaft confining a channel that is communicated with said central hole; and an auxiliary blade member including a rod that is received in said channel and that has one end extending through said central hole, and left and right leaves extending radially and oppositely from said end of said rod and substantially parallel to said left and right blades, said primary blade member and said left and right limbs being rotatable about said axis when said first shaft rotates, said auxiliary blade member being held fast by said container when said primary blade member and said left and right limbs rotate about said axis.

* * * * *